(No Model.) 2 Sheets—Sheet 1.

T. C. ROBINSON.
TRIMMING ATTACHMENT FOR SEWING MACHINES.

No. 278,825. Patented June 5, 1883.

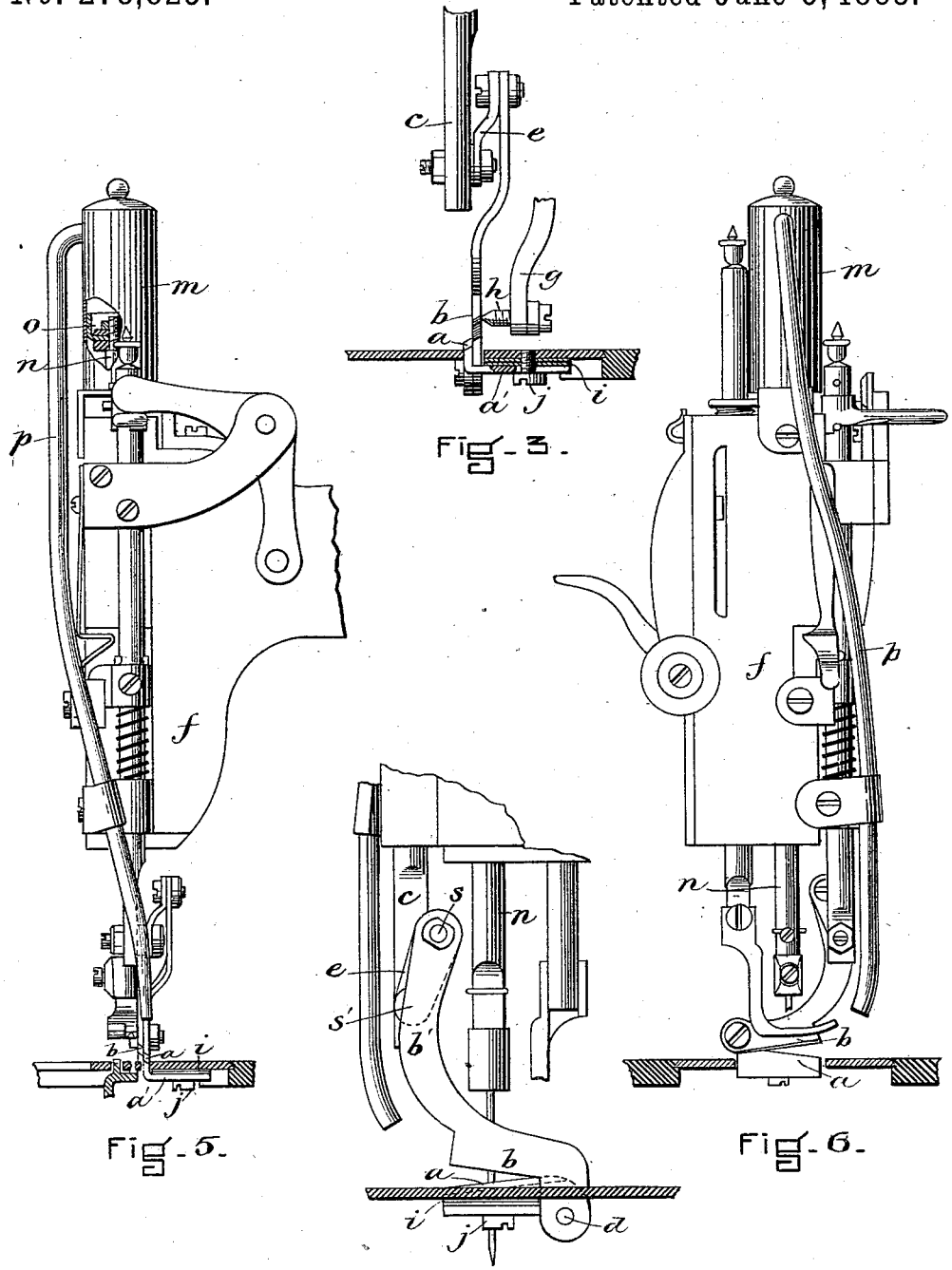

UNITED STATES PATENT OFFICE.

THOMAS C. ROBINSON, OF BOSTON, ASSIGNOR TO HIMSELF, AND E. B. WELCH, OF CAMBRIDGE, MASSACHUSETTS.

TRIMMING ATTACHMENT FOR SEWING-MACHINES.

SPECIFICATION forming part of Letters Patent No. 278,825, dated June 5, 1883.

Application filed March 15, 1883. (No model.)

*To all whom it may concern:*

Be it known that I, THOMAS C. ROBINSON, of Boston, in the county of Suffolk and State of Massachusetts, have invented certain Improvements in Trimming Attachments for Sewing-Machines, of which the following is a specification.

This invention has for its object, first, to provide certain improvements in sewing-machine trimmer attachments employing a fixed blade and a reciprocating blade in rubbing contact with the fixed blade, whereby the desired degree of impinging pressure of one blade against the other may be maintained and wear of said blades compensated for. The invention also has for its object to provide improved means for operating a pivoted trimming or shearing knife by a vertically-reciprocating knife-bar.

To these ends my invention consists in the improvements which I will now proceed to describe and claim.

Figure 1:
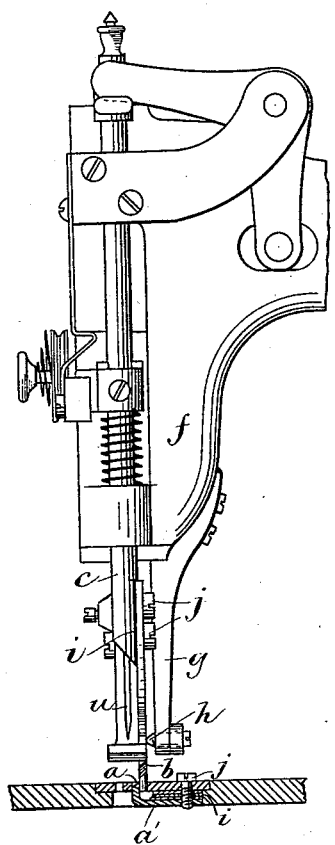
Figure 2:
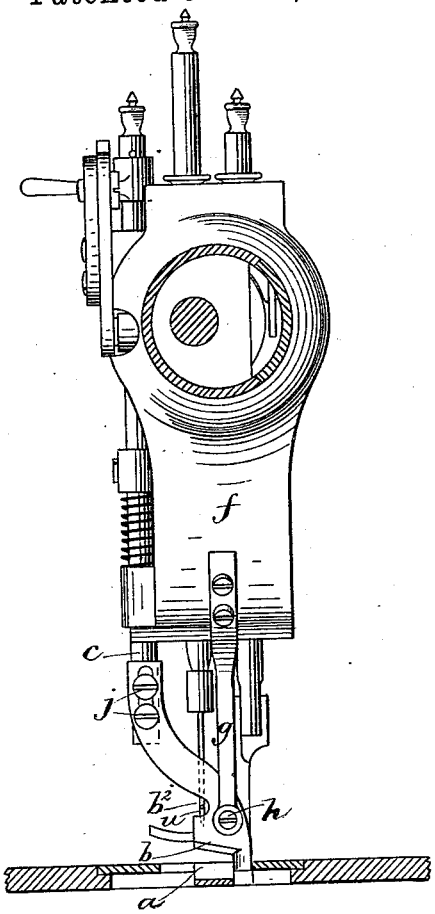

Of the accompanying drawings, forming a part of this specification, Figure 1 represents an elevation of the head and a section of a portion of the bed of a sewing-machine embodying some of my improvements. Fig. 2 represents a transverse section of the arm, a view of the inner side of the head, and a section of a portion of the bed of the machine. Figs. 3 and 4 represent elevations of portions of a sewing-machine, showing a pivoted cutting-blade and its connection to the knife-bar. Figs. 5 and 6 are elevations showing the blowing attachment.

The same letters of reference indicate the same parts in all the figures.

In the drawings, *a* represents the fixed blade, and *b* the movable blade, of a sewing-machine trimmer attachment, the latter being in rubbing contact with the former, so that the cutting-edges of the two blades will co-operate in severing material placed between them.

So far as the chief part of my improvement is concerned—viz., the provision of a device bearing against the movable blade to press it against the other—the construction, arrangement, and operation of said blades may be variously modified without departing from the spirit of my invention. The movable blade may be attached rigidly to a vertically-reciprocating knife-bar, *c*, as shown in Figs. 1 and 2, and move in a rectilinear vertical direction, or may be pivoted at *d* to a fixed support attached to the bed of the machine, and connected to said knife-bar by a link, *e*, as shown in Figs. 3 and 4, so as to be oscillated on its pivot by the needle-bar like an ordinary shear-blade.

In carrying out my invention I secure rigidly to the head *f* of the machine a downwardly-projecting arm, *g*, having in its lower end a screw, *h*, held in a threaded orifice in said arm, and adapted to bear at one end against the side of the movable blade *b* and press the latter against the fixed blade, so as to cause the cutting-edges of the two blades to impinge against each other with the desired degree of lateral pressure. The blades are thus caused to operate with an impinging cut similar to that exerted by one blade of an ordinary pair of shears against the other, said blades being arranged so that the cutting-edge of one is somewhat diagonal to that of the other. The adjustability of the screw *h* in the arm *g* enables said screw to keep the impinging pressure of the blades at the required degree, and to compensate for the wear of the proximate sides of said blades. The threads of the screw and of its socket positively hold the bearing end of the screw in any position to which the same may be adjusted, so that any desired degree of impinging pressure of one blade against the other may be produced and maintained uninterruptedly. The end of the screw may, if desired, be provided with a friction-roller to diminish its friction on the side of the moving cutter. By the provision of this pressure-regulating device a vertically-reciprocating blade such as is shown in Fig. 2 is enabled to operate in connection with a fixed blade with as good results as a pivoted shear-blade arranged somewhat diagonally with relation to its co-operating blade in the usual manner.

*i* represents a series of thin plates or shims interposed between the shank *a'* of the fixed blade *a* and the bed of the machine, and between the shank of the movable blade *b* and the knife-bar when the movable blade is rigidly attached to the knife-bar. Said shims are clamped between said parts and held by the attaching-screws *j*. Whenever it is desired to adjust the blade *a* upwardly or downwardly, or the blade $b$ laterally, one or more shims $i$ may be removed or inserted, as the case may be.

$m$ represents a cylinder attached to the head $f$ of the machine over the needle-bar $n$.

$o$ represents a piston attached to the needle-bar and reciprocated by the latter in the cylinder, and $p$ represents a tube extending from the upper portion of the cylinder downwardly to a point near the cutting-blades of the trimmer attachment. The piston $o$ preferably has a suitable valve, which opens when the piston is moving downwardly. It will be seen that the movement of the piston in the cylinder by the needle-bar will cause air to be expelled intermittently through the tube $p$ upon the bed of the machine, said air removing from the vicinity of the needle and cutting-blades any scraps, cuttings, and other débris formed by said blades, and preventing such débris from clogging the binder or folder, if one be employed, or from being otherwise objectionable.

I do not here claim the above-described knife-adjusting devices, nor the blowing attachment, but the latter—viz., the blowing attachment—will form the subject of a separate application.

When the movable blade $b$ is pivoted to a fixed support, as shown in Figs. 3 and 4, its shank should be curved upwardly to form an arm, $b'$, to which the link $e$ is pivoted at $s$. Said link is also pivoted at $s'$ to the vertically-reciprocating knife-bar, and constitutes a desirable and comparatively frictionless connection between the knife-bar and knife, oscillating the latter by the vertical movements of the former without the friction which would be involved by the employment of a stud on the knife-bar working in a slot in the knife. The blade $b$, when affixed to the knife-bar, has a recess or aperture, $b^2$, (see Fig. 2,) adapted to coincide with the eye of the needle $u$ and enable the latter to be conveniently threaded.

It will be evident that the adjusting device may be differently constructed.

Reserving for separate applications for Letters Patent any patentable features not specifically claimed,

I claim—

1. A sewing-machine provided with a shearing-blade fixed to the bed, a reciprocating blade, and the adjusting device therefor, carried by an independent rigid stationary support and bearing upon the reciprocating blade, all as set forth.

2. The movable blade having an aperture or recess, $b^2$, adapted to coincide with the eye of the needle, as set forth.

In testimony whereof I have signed my name to this specification, in the presence of two subscribing witnesses, this 13th day of March, 1883.

THOMAS C. ROBINSON.

Witnesses:
C. F. BROWN,
A. L. WHITE.